United States Patent
Urakami

(10) Patent No.: US 10,812,719 B2
(45) Date of Patent: Oct. 20, 2020

(54) IMAGE PROCESSING APPARATUS, IMAGING APPARATUS, AND IMAGE PROCESSING METHOD FOR REDUCING NOISE AND CORRECTS SHAKING OF IMAGE DATA

(71) Applicant: CANON KABUSHIKI KAISHA, Tokyo (JP)

(72) Inventor: Hiroyuki Urakami, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 47 days.

(21) Appl. No.: 16/141,662

(22) Filed: Sep. 25, 2018

(65) Prior Publication Data
US 2019/0098216 A1 Mar. 28, 2019

(30) Foreign Application Priority Data

Sep. 27, 2017 (JP) .................................. 2017-186768
Sep. 3, 2018 (JP) .................................. 2018-164468

(51) Int. Cl.
| H04N 5/228 | (2006.01) |
| H04N 5/232 | (2006.01) |
| H04N 5/217 | (2011.01) |
| G06T 5/20 | (2006.01) |
| G06T 7/246 | (2017.01) |
| G06T 5/00 | (2006.01) |

(52) U.S. Cl.
CPC ......... *H04N 5/23267* (2013.01); *G06T 5/003* (2013.01); *G06T 5/20* (2013.01); *G06T 7/246* (2017.01); *H04N 5/217* (2013.01); *H04N 5/23254* (2013.01); *H04N 5/23258* (2013.01)

(58) Field of Classification Search
CPC ............................. H04N 5/23267; G06T 7/246
USPC ....................................................... 348/208.1
See application file for complete search history.

(56) References Cited

U.S. PATENT DOCUMENTS

| 2009/0059017 A1 | 3/2009 | Kurokawa |
| 2009/0161756 A1 | 6/2009 | Lin |

(Continued)

FOREIGN PATENT DOCUMENTS

| EP | 2680567 A1 | 1/2014 |
| JP | 2012-129617 A | 7/2012 |
| JP | 2014039169 A | 2/2014 |

*Primary Examiner* — Usman A Khan
(74) *Attorney, Agent, or Firm* — Canon U.S.A., Inc. IP Division

(57) ABSTRACT

A movement amount detection circuit detects a movement amount from image data that has been imaged. A shaking amount calculation circuit calculates a shaking amount of an imaging apparatus that has imaged the image data. An intensity determination circuit sets intensity of cyclic noise reduction (NR) processing. The cyclic NR processing circuit performs cyclic NR processing on the image data with the set intensity. A shaking correction circuit performs shaking correction processing that suppresses shaking of the image data subjected to the cyclic NR processing based on the shaking amount. The intensity determination circuit controls the intensity of the cyclic NR processing in units of areas based on the movement amount when the shaking correction processing is not in operation and controls the intensity of the cyclic NR processing uniformly to all areas of the image data when the shaking correction processing is in operation.

14 Claims, 8 Drawing Sheets

(56) References Cited

U.S. PATENT DOCUMENTS

2012/0212663 A1\* 8/2012 Takita .................... H04N 5/238
  348/364
2016/0006978 A1\* 1/2016 Satoh ................. H04N 5/23267
  386/269

\* cited by examiner

IMAGE PROCESSING APPARATUS, IMAGING APPARATUS, AND IMAGE PROCESSING METHOD FOR REDUCING NOISE AND CORRECTS SHAKING OF IMAGE DATA

BACKGROUND OF THE INVENTION

Field of the Invention

The present invention relates to a technology that reduces noise and corrects shaking of image data.

Description of the Related Art

Cyclic noise reduction processing is known as an image processing technology aimed at reducing noise of image data. For example, Japanese Patent Application Laid Open No. 2012-129617 discusses a technology that detects a movement amount in units of pixels and performs cyclic noise reduction processing on the intensity of the image data (which is set in units of pixels) in accordance with the detected movement amount. An imaging apparatus can for example implement the cyclic noise reduction processing.

Japanese Patent Application Laid-Open No. 2014-39169 discusses a technology that estimates a movement amount between two different pieces of image data and generates motion-compensated image data based on the estimated movement amount. By generating the motion-compensated image data, shaking correction processing can be performed on the image data.

When the shaking correction processing is applied to the image data after application of the above-described cyclic noise reduction processing, it has been found that, in some cases, it generates image data which appears to have regions where shaking occurred and regions where shaking did not occur.

SUMMARY OF THE INVENTION

The present invention suppresses generation of image data that appears to have regions where shaking occurs and regions where shaking does not occur when cyclic noise reduction (NR) processing is applied.

According to an aspect of the present invention, an image processing apparatus includes a movement amount detection circuit that detects a movement amount from each area of image data, a shaking amount calculation circuit that calculates a shaking amount of an imaging apparatus that has imaged the image data, a processing circuit that performs cyclic noise reduction processing on the image data, a control circuit that controls the cyclic noise reduction processing, and a correction circuit that selectively performs shaking correction processing to suppress shaking of the image data subjected to the cyclic noise reduction processing based on the shaking amount, wherein the control unit sets an intensity of the cyclic noise reduction processing in units of areas based on the movement amount in a case where a predetermined condition is satisfied, and wherein the control unit sets the intensity of the cyclic noise reduction processing uniformly to all areas of the image data in a case where the predetermined condition is not satisfied.

Further features of the present invention will become apparent from the following description of exemplary embodiments with reference to the attached drawings.

DESCRIPTION OF THE EMBODIMENTS

Figure 1:
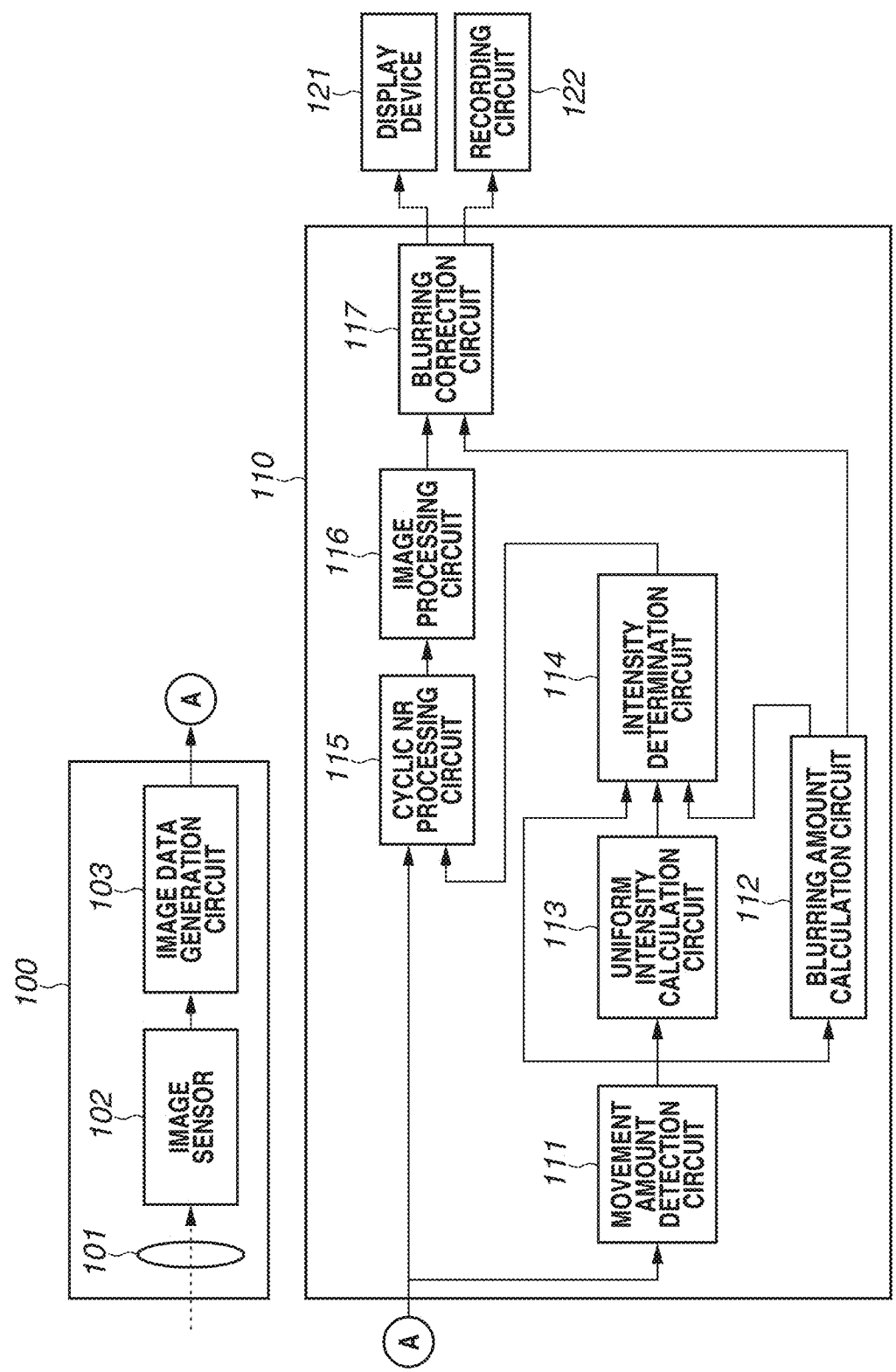
FIG. 1 is a block diagram illustrating a schematic configuration of an imaging apparatus according to a first exemplary embodiment.

Hereinafter, exemplary embodiments of the present invention will be described in detail with reference to the attached drawings.

In the present exemplary embodiment, an imaging apparatus will be described as an example application of the present invention.

An imaging apparatus according to the present exemplary embodiment has various function. One of the functions performs cyclic noise reduction processing for reducing noise in image data. In the description that follows, the cyclic noise reduction processing is referred to as cyclic NR processing. Further, the imaging apparatus according to the present exemplary embodiment has a shaking correction function. The shaking correction function determines information on the shaking of the imaging apparatus while imaging and performs shaking correction processing on the image data based on this information of the shaking. The application of the shaking correction function may be controlled by the imaging apparatus based on, for example, the shaking information. For example, the imaging apparatus may operate the shaking correction function when a shaking amount (magnitude of shaking) obtained while imaging is more than a predetermined shaking amount and, conversely, stop (or rather not operate) the shaking correction function when the shaking amount is less than or equal to the predetermined shaking amount (i.e., when there is almost no shaking of the imaging apparatus). It is assumed that the predetermined shaking amount that determines whether to operate the shaking correction function is a predetermined value.

As will be described in detail below, the imaging apparatus according to the present exemplary embodiment has a function of detecting a movement amount in units of areas. The imaging apparatus also functions to control an intensity of the cyclic NR processing in units of areas based on the detected movement amount. In the description that follows, the cyclic NR processing performed with the intensity in units of areas is referred to as cyclic NR processing in units of areas. In some cases, the cyclic NR processing may be uniformly applied to all areas in image data, and the intensity of the cyclic NR processing for this uniform application may be calculated by the imaging apparatus based on information of the movement amount (in units of areas). In the following description, this cyclic NR processing applied with the uniform intensity to all the areas is referred to as uniform cyclic NR processing. Instead of the configuration in which the cyclic NR processing is performed with the intensity set in units of areas, a configuration can be adopted in which the cyclic NR processing is performed with intensity set in units of pixels. Here, the configuration in which each area includes one or more pixels and the cyclic NR processing is performed with the intensity set in units of areas will be taken as an example.

Hereinafter, a configuration and processing that controls the intensity of cyclic NR processing based on a shaking amount and a movement amount in an imaging apparatus according to a first exemplary embodiment will be described with reference to FIGS. 1 to 5.

FIG. 1 is a block diagram illustrating a schematic configuration example of the imaging apparatus according to the present exemplary embodiment. Incidentally, FIG. 1 illustrates only main components that control the intensity based on the shaking amount and the movement amount, and an illustration of other general components included in the imaging apparatus is omitted.

The imaging apparatus includes an image generation apparatus 100, an image processing apparatus 110, a display device 121, and a recording circuit 122. The image generation apparatus 100 includes an imaging optical system 101, an image sensor 102 that converts an optical image formed by the imaging optical system 101 into an electric signal, and an image data generation circuit 103 that generates image data from an electric signal generated by the image sensor 102. The image data generated by the image data generation circuit 103 is output to the image processing apparatus 110.

The image processing apparatus 110 includes a movement amount detection circuit 111, a shaking amount calculation circuit 112 (e.g. a blurring amount calculation circuit), a uniform intensity calculation circuit 113, an intensity determination circuit 114, a cyclic NR processing circuit 115, an image processing circuit 116, and a shaking correction circuit 117 (e.g. a blurring correction unit). The movement amount detection circuit 111 receives image data of consecutive frames from the image data generation circuit 103, divides each image data into a plurality of areas and detects a movement amount for each area (motion vector) from reference image data (which is one of the frames) and image data one frame before the reference image data. Then, information of the detected movement amount is output to the shaking amount calculation circuit 112 and the uniform intensity calculation circuit 113.

The shaking amount calculation circuit 112 calculates magnitude of shaking (shaking amount) and a direction of shaking when the imaging apparatus is shaking while imaging. For example, the shaking amount calculation circuit 112 acquires the information of the movement amount detected by the movement amount detection circuit 111 and estimates the shaking amount of the imaging apparatus based on the movement amount. Various methods exist for estimation processing of the shaking amount based on the movement amount, and, in the present exemplary embodiment, any one of these methods can be used. As another example, the shaking amount calculation circuit 112 can detect the shaking amount of the imaging apparatus based on data obtained from devices such as an acceleration sensor (not illustrated) and an angular velocity sensor (not illustrated). Also, various methods exist for calculation of the shaking amount based on the data or the like from the acceleration sensor, the angular velocity sensor, and the like, and, in the present exemplary embodiment, any one of these methods can be used. The shaking amount calculation circuit 112 outputs the information of the shaking amount estimated or calculated as described above to the intensity determination circuit 114 and the shaking correction circuit 117.

The uniform intensity calculation circuit 113 calculates intensity (uniform intensity) of cyclic NR processing applied uniformly to all areas based on the information of the movement amount acquired from the movement amount detection circuit 111. The intensity determination circuit 114 determines whether to perform shaking correction processing in the shaking correction circuit 117 installed subsequently based on the shaking amount acquired from the shaking amount calculation circuit 112. Then, in a case where the shaking correction processing is performed by the shaking correction circuit 117, the intensity determination circuit 114 performs the cyclic NR processing with the intensity calculated by the uniform intensity calculation circuit 113 before the cyclic NR processing circuit 115 starts the shaking correction processing. Whether to subsequently perform the shaking correction processing by the shaking correction circuit 117 can be determined, for example, based on whether the calculated shaking amount is more than a predetermined shaking amount. In a case where, for example, the calculated shaking amount is more than the predetermined shaking amount, the shaking correction processing is determined to be performed, whereas in a case where the calculated shaking amount is equal to or less than the predetermined shaking amount, the shaking correction processing is determined not to be performed.

The uniform intensity calculation circuit 113 firstly acquires statistical data of the movement amount detected by the movement amount detection circuit 111. The statistical data includes an average value, a median value, a maximum value, a minimum value, and a variance of the movement amount. Next, the uniform intensity calculation circuit 113 obtains a variation degree of the movement amount in the reference image data from the variance of the statistical data. Further, the uniform intensity calculation circuit 113 selects a reference value of the movement amount when calculating the uniform intensity from the statistical data based on the variation degree of the movement amount. The uniform intensity calculation circuit 113 calculates the uniform intensity to be uniformly applied to all the areas using the selected reference value of the movement amount. How to select the reference value of the movement amount when calculating the uniform intensity will be described below. Then, the uniform intensity calculation circuit 113 outputs information of the calculated uniform intensity to the intensity determination circuit 114.

The intensity determination circuit 114 calculates the intensity (intensity in units of areas) of the cyclic NR processing in units of areas based on the movement amount for each area detected by the movement amount detection circuit 111. Further, the intensity determination circuit 114 acquires the uniform intensity to be applied to all the areas from the uniform intensity calculation circuit 113, and determines which of the uniform intensity and the intensity in units of areas to be selected and output based on the shaking amount calculated by the shaking amount calculation circuit 112. In the present exemplary embodiment, the intensity determination circuit 114 selects the intensity in units of areas in a case where the calculated shaking amount is equal to or less than a predetermined shaking amount and the subsequent shaking correction processing is not performed. On the other hand, in the present exemplary embodiment, the intensity determination circuit 114 selects the uniform intensity in a case where the detected shaking amount is more than the predetermined shaking amount and the subsequent shaking correction processing is performed. Then, as described above, the intensity determination circuit 114 outputs, to the cyclic NR processing circuit 115, information of the selected intensity (i.e. either the uniform intensity or the intensity in units of areas).

The cyclic NR processing circuit 115 performs cyclic NR processing on the image data received from the image generation apparatus 100 based on the selected intensity (i e uniform intensity or the intensity in units of areas) supplied from the intensity determination circuit 114. Then, the cyclic NR processing circuit 115 outputs the image data subjected to the cyclic NR processing to the image processing circuit 116.

The image processing circuit 116 performs various kinds of image processing other than the cyclic NR processing. This other type of processing is applied on the image data subjected to the cyclic NR processing (i.e. the processed image provided by the cyclic NR processing circuit 115). For example, the image processing circuit 116 performs various kinds of image processing such as spatial noise reduction processing (spatial NR processing) that performs spatial filter processing with one piece of image data, sharpness processing that increases sharpness, and gradation correction processing that improves expressions of intermediate gradation. The image processing circuit 116 outputs the image data subjected to the image processing to the shaking correction circuit 117.

The shaking correction circuit 117 switches whether to perform the shaking correction processing based on the shaking amount received from the shaking amount calculation circuit 112. In a case where it is determined that the shaking correction processing is to be performed, the shaking amount calculation circuit 112 performs the shaking correction processing according to the shaking amount from the shaking amount calculation circuit 112. Specifically, the shaking correction circuit 117 stops the shaking correction processing in a case where the detected shaking amount is equal to or less than the predetermined shaking amount, and performs the shaking correction processing according to a shaking direction and the shaking amount in a case where the shaking amount is more than the predetermined shaking amount. As an example, the shaking correction processing is processing of cutting out a portion of image data at a position shifted by an amount corresponding to the shaking amount in a direction opposite to the shaking direction. The image data on which the shaking correction processing is performed by the shaking correction circuit 117, or the image data on which the shaking correction processing is not performed because there is no shaking, is output to the display device 121, the recording circuit 122, or the like.

The image data output from the shaking correction circuit 117 can be recorded on a recording medium by the recording circuit 122, or it can be used for image display by the display device 121. Alternatively, the image data output from the shaking correction circuit 117 can be transmitted to an external device by a communication apparatus (not illustrated).

Figure 2:
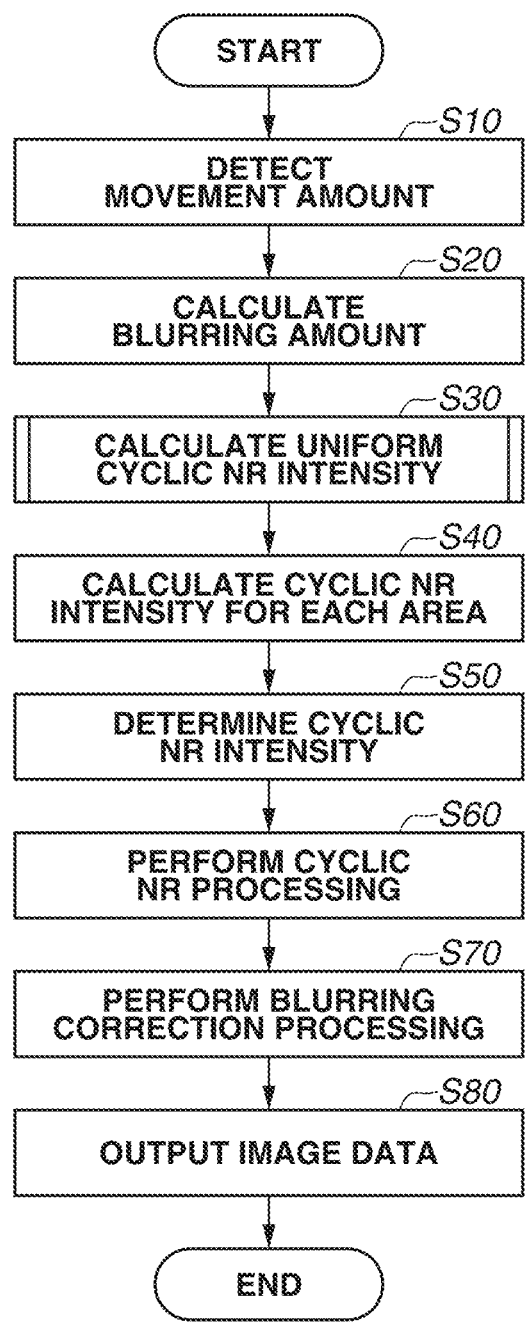
FIG. 2 is a flowchart illustrating a process flow in the first exemplary embodiment.

FIG. 2 is a flowchart illustrating a flow of a series of processing performed by the imaging apparatus according to the present exemplary embodiment illustrated in FIG. 1. The series of processing includes the detection of the movement amount, the calculation of the shaking amount, the determination of the intensity of the cyclic NR processing, the cyclic NR processing, the shaking correction processing, and the output of the image data, in this order. In FIG. 2, steps 10 to 80 of the processing are abbreviated as steps S10 to S80, respectively. The processing in the flowchart of FIG. 2 can be performed by a hardware configuration or can be implemented by a central processing unit (CPU) or the like executing a program. This also applies to other flowcharts described below. The processing of the flowchart illustrated in FIG. 2 starts by generation of the image data by the image generation apparatus 100.

In step S10, the image processing apparatus 110 acquires the image data generated by the image generation apparatus 100, and the movement amount detection circuit 111 of the image processing apparatus 110 detects the movement amount (motion vector) for each area. In step S20, the shaking amount calculation circuit 112 calculates the shaking amount of the imaging apparatus. As described above, the shaking amount can be detected based on the movement amount detected by the movement amount detection circuit 111, or it can be detected based on the output from a device such as an acceleration sensor. The information of the shaking amount detected by the shaking amount calculation circuit 112 is sent to, as described above, the intensity determination circuit 114 and the shaking correction circuit 117.

In step S30, the uniform intensity calculation circuit 113 calculates, as described above, the uniform intensity of the cyclic NR processing to be applied uniformly to all the areas of the image data based on the movement amount detected in step S10 and the shaking amount calculated in step S20. The calculation processing of the uniform intensity will be described below with reference to the flowchart of FIG. 3.

In step S40, the intensity determination circuit 114 calculates, as described above, the intensity of the cyclic NR processing for each area based on the movement amount for each area detected by the movement amount detection circuit 111.

In step S50, the intensity determination circuit 114 selects, as described above, either the uniform intensity or the intensity for each area based on the shaking amount calculated by the shaking amount calculation circuit 112, and outputs the selected intensity to the cyclic NR processing circuit 115.

In step S60, the cyclic NR processing circuit 115 performs the cyclic NR processing using the intensity selected in step S50 on the image data.

Here, if a signal level of the image data at coordinates (x, y) of the N-th frame before application of the cyclic NR processing is $V_{xyN}$, a signal level of the image data at coordinates (x, y) of the N-th frame after application of the cyclic NR processing is $W_{xyN}$, a signal level of the image data at coordinates (x, y) of the (N−1)-th frame after application of the cyclic NR processing is $W_{xy(N-1)}$, and a coefficient as the intensity of the cyclic NR processing is k, the following equation holds:

$$W_{xyN} = k \times (V_{xyN} - W_{xy(N-1)}) + W_{xy(N-1)} \quad (1)$$

Alternatively, Equation 1 can be transformed and expressed as Equation 2 below:

$$W_{xyN} = k \times V_{xyN} + (1-k) \times W_{xy(N-1)} \quad (2)$$

The value of the coefficient k is greater than or equal to 0 and less than or equal to 1, and as the value of the coefficient k approaches 0, the value $W_{xyN}$ after application of the cyclic NR processing approaches the value $W_{xy(N-1)}$ after application of the cyclic NR processing to the preceding frame. Conversely, as the value of the coefficient k approaches 1, the value $W_{xyN}$ after application of the cyclic NR processing approaches the value $V_{xyN}$ before application of the cyclic NR processing. That is, as the value of the coefficient k approaches 0, a change amount of the signal level of the image data at coordinates (x, y) decreases between the preceding and succeeding frames so that variations of the signal level due to noise can be suppressed. Conversely, as the value of the coefficient k approaches 1, an influence of the signal level of the preceding frame on the signal level of the subsequent frame can be reduced. In general, with a decreasing movement amount of a subject, the value of the coefficient k is set to a value closer to 0 to suppress variations of the signal level due to noise, and with an increasing movement amount of the subject, the value of the coefficient k is set to a value closer to 1 to reduce the influence of the signal level of the preceding frame. The uniform intensity indicates a coefficient k that is uniformly set to all areas included in one frame, and the intensity in units of areas indicates a coefficient k set individually for each area of one frame. In the present exemplary embodiment, it is assumed that the intensity of the cyclic NR processing becomes higher (the influence of the signal level of the preceding frame increases) as the value of the coefficient k approaches 0, and the intensity of the cyclic NR processing becomes lower (the influence of the signal level of the preceding frame decreases) as the value of the coefficient k approaches 1.

In step S70, the shaking correction circuit 117 performs the shaking correction processing based on the shaking amount calculated in step S20 on the image data subjected to the cyclic NR processing by the cyclic NR processing circuit 115.

In step S80, the shaking correction circuit 117 outputs the image data subjected to the cyclic NR processing, shaking correction processing, or the like to the display device 121 or the recording circuit 122.

Figure 3:
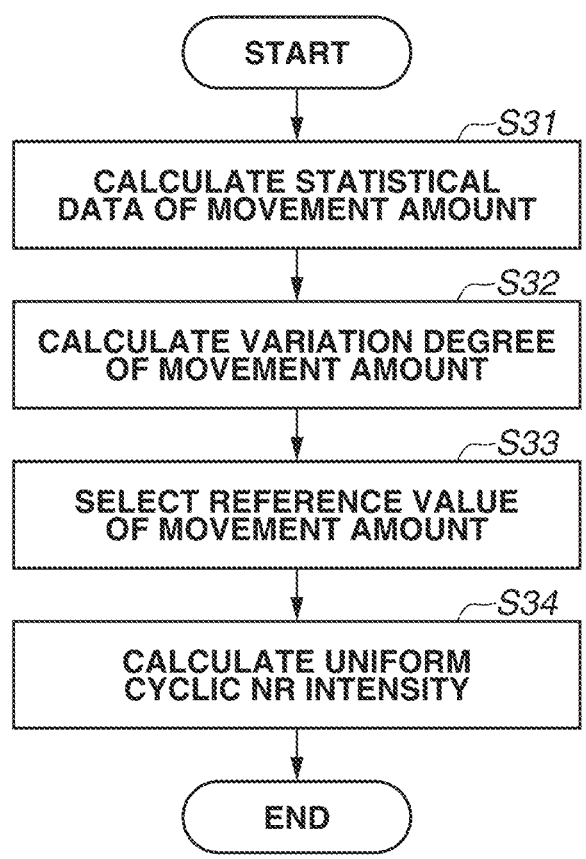
FIG. 3 is a flowchart of uniform intensity calculation processing in the first exemplary embodiment.

FIG. 3 is a flowchart illustrating a detailed flow of the processing of calculating the uniform intensity performed by the uniform intensity calculation circuit 113 in step S30 of FIG. 2.

In step S31 of FIG. 3, the uniform intensity calculation circuit 113 acquires the movement amount for each area detected by the movement amount detection circuit 111, and further calculates the statistical data of the movement amount in the reference image data (the average value, median value, maximum value, minimum value, variance, and the like of the movement amount).

In step S32, the uniform intensity calculation circuit 113 calculates the variation degree of the movement amount in the reference image data from the variance in the statistical data of the movement amount calculated in step S31.

In step S33, the uniform intensity calculation circuit 113 selects the reference value of the movement amount used for calculating the uniform intensity based on the variation degree of the movement amount calculated in step S32. In this case, the uniform intensity calculation circuit 113 first selects data to be a reference (reference value) from the statistical data of the movement amount of the reference image data described above. For example, in a case where the variation degree of the movement amount of the reference image data is smaller than a predetermined value, the uniform intensity calculation circuit 113 selects the average value in the statistical data of the movement amount described above as the reference value of the movement amount. That is, in a case where the variation degree of the movement amount is smaller than the predetermined value, a difference between the average value of the movement amount and the maximum value of the movement amount or a difference between the average value and the minimum value is small. Thus, the average value of the statistical data of the movement amount can be approximately considered as the reference value. In a case where the variation degree of the movement amount of the reference image data is smaller than the predetermined value, the uniform intensity calculation circuit 113 can select the median value in the statistical data of the movement amount as the reference value.

On the other hand, in a case where the variation degree of the movement amount is greater than or equal to the predetermined value, if the average value or the median value of the statistical data of the movement amount is used as the reference value as described above, the intensity of the cyclic NR processing becomes unnecessarily high depending on the area, which may cause an afterimage due to the influence of the preceding frame. Therefore, in a case where the variation degree of the movement amount is greater than or equal to the predetermined value, the uniform intensity calculation circuit 113 selects, as the reference value of the movement amount, the maximum value of the movement amount at which the intensity becomes the lowest in the statistical data of the movement amount, to suppress the occurrence of the afterimage. In the uniform intensity as well, like in the intensity of the general cyclic NR processing, the value of the coefficient k is set to a value closer to 0 (the intensity is increased) with a decreasing movement amount of a subject, and the value of the coefficient k is set to a value closer to 1 (the intensity is decreased) with an increasing movement amount of the subject.

In step S34, the uniform intensity calculation circuit 113 calculates the uniform intensity to be uniformly applied to all the areas based on the reference value acquired in step S33.

Incidentally, the above-described predetermined value to be compared with the variation degree of the acquired movement amount can be experimentally determined. When the predetermined value is experimentally determined, for example, a plurality of test moving images having different variation degrees of the movement amount is prepared. Then, a degree of the afterimage of the moving image when the intensity based on the average value of the movement amount is set is determined in ascending order of variation degree of the movement amount, and when the afterimage is determined to be annoying for the first time, the variation degree of the movement amount of the relevant moving image can be set as the predetermined value.

Figure 4:
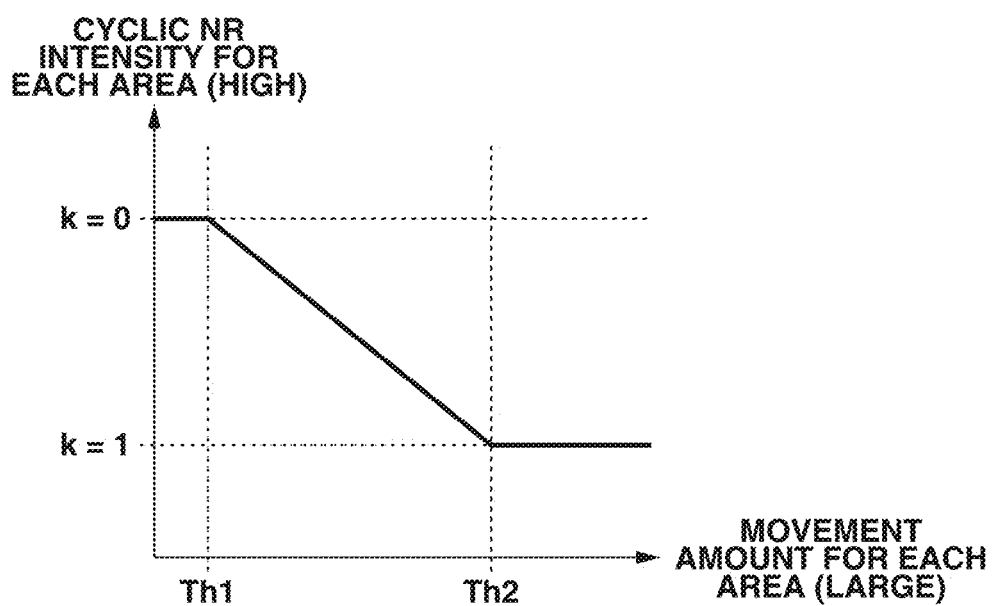
FIG. 4 is a diagram illustrating a relationship between a movement amount for each area and an intensity in units of areas for the cyclic noise reduction (NR) processing in the first exemplary embodiment.

FIG. 4 is a diagram illustrating a relationship between the movement amount for each area and the intensity of the cyclic NR processing in intensity control. FIG. 4 is a diagram illustrating the intensity in units of areas determined by the intensity determination circuit 114 in a case where the shaking correction processing is not performed (when the shaking correction processing is invalid). In a case where there is almost no shaking of the imaging apparatus and the shaking correction processing is not performed, the intensity determination circuit 114 selects, instead of the uniform intensity, the intensity in units of areas.

As illustrated in FIG. 4, the intensity determination circuit 114 decreases the intensity for a region with an increasing movement amount because priority is given to the prevention of an occurrence of afterimages in a region of a moving subject. On the other hand, the intensity determination circuit 114 increases the intensity for a region with a decreasing movement amount because risks of an occurrence of afterimages in a region of a subject decrease and priority is given to the reduction of noise. Specifically, in the example of FIG. 4, the value of the coefficient k is set to 0 if the movement amount is less than a threshold value Th1, the value of the coefficient k is set to 1 if the movement amount is a threshold value Th2 or more, and if the movement amount is the threshold value Th1 or more and less than the threshold value Th2, the coefficient k approaches 1 with an increasing movement amount. Note that Th1 can be 0. In this case, if there is a plurality of regions with different movement amounts in one piece of image data, as illustrated in FIG. 4, regions of relatively weak intensity of the cyclic NR processing and regions of relatively strong intensity of the cyclic NR processing exist.

Figure 5:
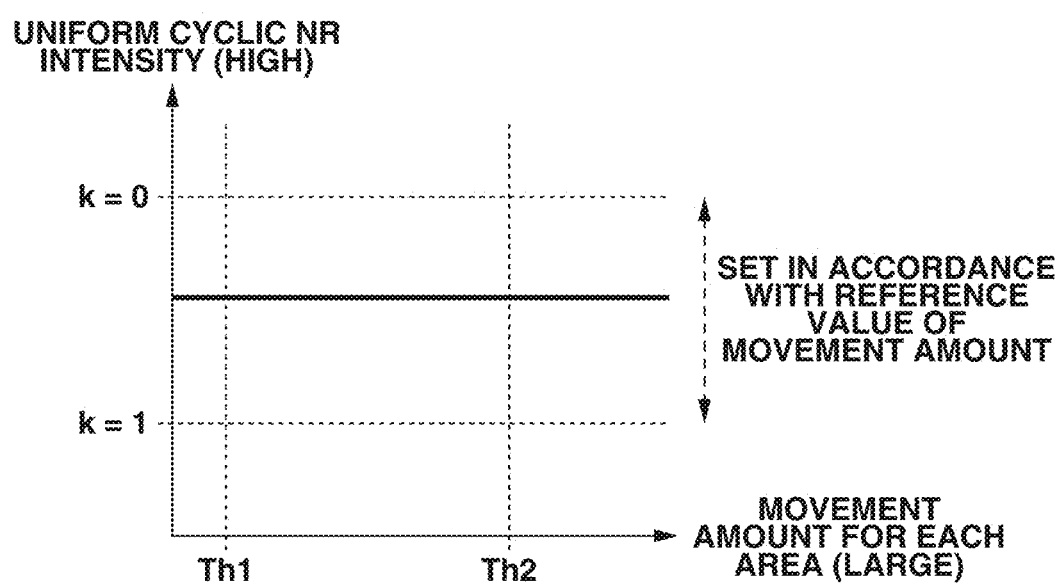
FIG. 5 is a diagram illustrating a relationship between the movement amount for each area and a uniform intensity for the cyclic NR processing in the first exemplary embodiment.

FIG. 5 illustrates, like FIG. 4, a relationship between the movement amount for each area and the intensity. FIG. 5 is a diagram illustrating the uniform intensity determined by the intensity determination circuit 114 in a case where the shaking correction processing is performed (in a case where the shaking correction processing is valid). As in the example of FIG. 5, in a case where the shaking correction processing that corrects shaking of the imaging apparatus is performed, the intensity determination circuit 114 selects, instead of the intensity in units of areas, the uniform intensity.

In other words, in a case where the shaking correction processing is performed, as illustrated in FIG. 5, the intensity determination circuit 114 prevents an occurrence of a difference of shaking amounts between regions of the image data by setting the intensity based on the reference value of one movement amount determined in the frame regardless of the movement amount for each area. That is, the cyclic NR processing circuit 115 performs the cyclic NR processing on all the areas with the uniform intensity.

Here, a reason why it is desirable to set, in a case where the shaking correction processing is performed, the uniform intensity, instead of the intensity in units of areas, will be described.

Figure 6A:
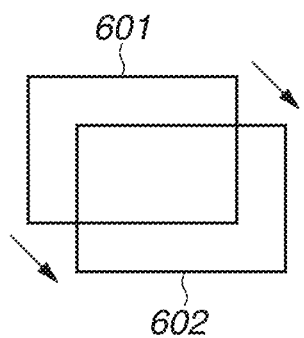
FIGS. 6A, 6B and 6C are diagrams illustrating states of image data when intensity is set in units of areas and shaking correction processing is performed.
Figure 6B:
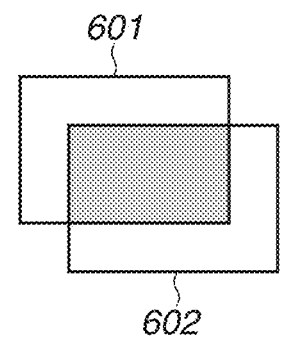
Figure 6C:
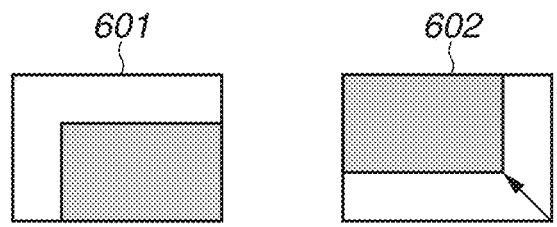

FIGS. 6A to 6C are diagrams illustrating states of the image data in a case where the intensity is set in units of areas and the shaking correction processing is performed. In FIG. 6A to FIG. 6C, it is assumed that the image data of each of the (N−1)-th frame and the N-th frame includes a building window as a subject. FIG. 6A illustrates a window 601 in the N-th frame and a window 602 in the (N−1)-th frame. It is assumed that the window 601 and the window 602 are the same window and positions in the image data of the respective frames are shifted by an amount indicated by arrows due to shaking. In the window 601 and the window 602, the sky appears in the inside of window frames indicated by solid lines. Although the signal levels inside the window frames are substantially uniform, there are variations in the signal levels due to noise. In contrast, it is assumed that the signal level of the window 601 (window 602) and that of the surrounding region are significantly different.

Here, processing in a case where the cyclic NR processing is applied to the (N−1)-th frame by setting the intensity in units of areas will be described. As illustrated in FIG. 6B, it is determined that a hatched portion of the window 601 and the window 602 has a small signal level difference and a small movement amount. That is, for the hatched portion of the window 602, the value of the coefficient k is set to 0 (or a value close to 0) and the signal level is corrected to the same value (or substantially the same value) as that of the hatched portion of the window 601. For other regions, it is determined that the difference in the signal level between frames is large and the value of the coefficient k is set to 1 (or a value close to 1). That is, the region of the window 602 other than the hatched portion is hardly affected by the signal level of the window 601.

Then, as illustrated in FIG. 6C, the position in the image data of the window 602 is corrected by the shaking correction processing. At this point, the signal level of the hatched portion of the window 602 coincides with that of the hatched portion of the window 601, whereas the signal level of the region other than the hatched portion does not coincide with that of the window 601. Thus, for a user, the image data of the hatched portion in the window 601 appears to have moved in a direction of an arrow in the window 602. In other words, for the user, it appears that a shaken region and an unshaken region are included inside the window 602.

Therefore, in the present exemplary embodiment, in a case where the shaking correction processing is performed after the cyclic NR processing, the uniform intensity is calculated within a frame, instead of calculating the intensity in units of areas. By adopting such a configuration, as illustrated in FIG. 6C, it can be suppressed that only a portion of the region looks shaken.

In the imaging apparatus according to the first exemplary embodiment, as described above, in a case where the shaking correction processing is not performed, the cyclic NR processing based on the movement amount for each area is performed by intensity control in units of areas. On the other hand, in a case where the shaking correction processing is performed, the cyclic NR processing with the uniform intensity is performed on all the areas of the image data. That is, according to the imaging apparatus according to the first exemplary embodiment, advantageously the generation of image data that appears to have regions where shaking occurs and regions where shaking does not occur can be suppressed by the intensity being appropriately controlled based on the shaking amount and the movement amount.

Figure 7A:
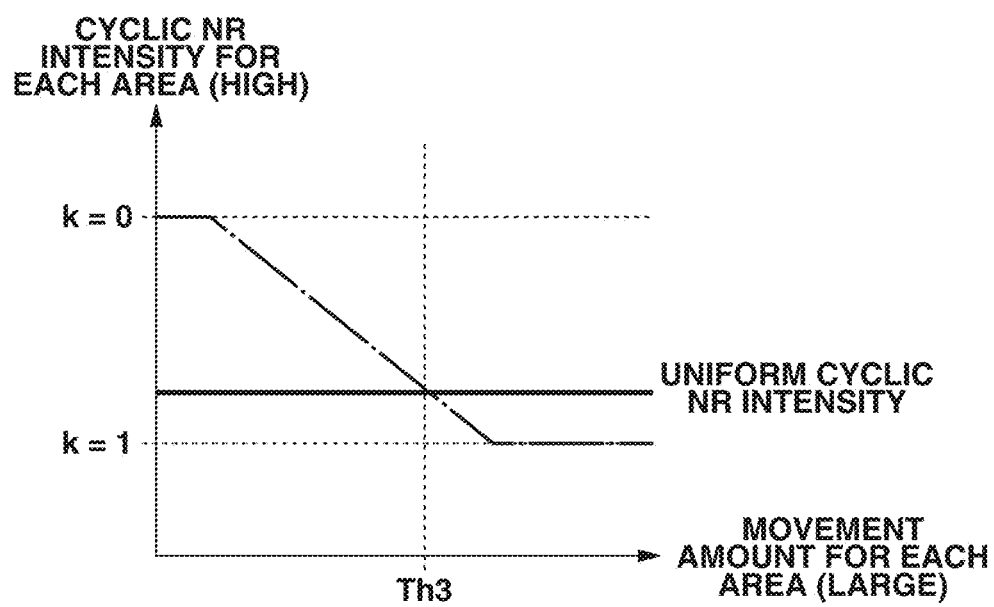
FIGS. 7A and 7B are diagrams illustrating a relationship between the intensity of the cyclic NR processing and the intensity of the spatial NR processing in a second exemplary embodiment.
Figure 7B:
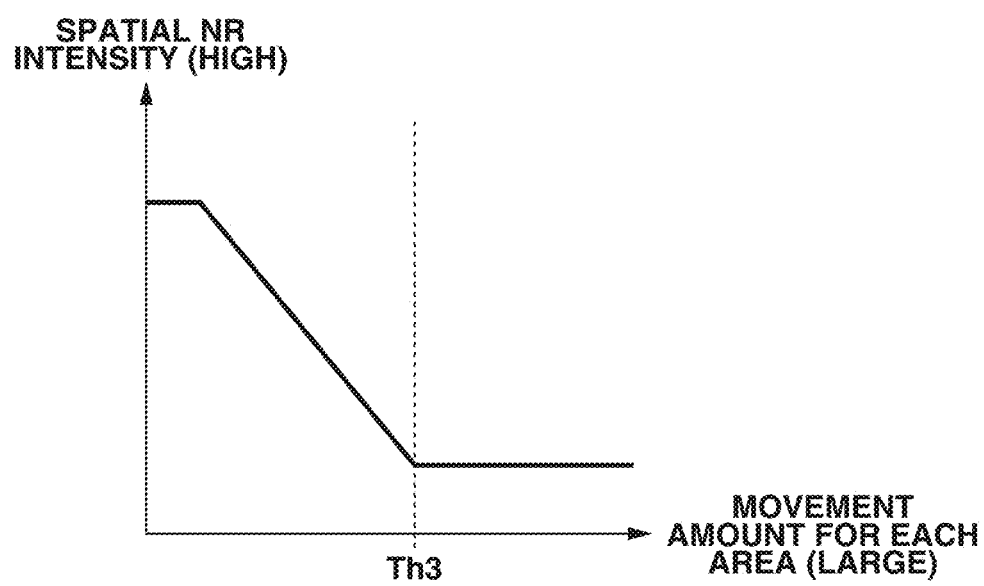

Hereinafter, a second exemplary embodiment will be described with reference to FIGS. 7A and 7B. FIGS. 7A and 7B are diagrams illustrating a relationship between intensity of cyclic NR processing and intensity of spatial NR processing. Since a configuration of an imaging apparatus according to the second exemplary embodiment is generally the same as that in FIG. 1, an illustration thereof is omitted.

In FIG. 7A, an alternate long and short dashed line shows intensity in units of areas with respect to a movement amount for each area, and a solid line shows uniform intensity based on a reference movement amount. Also in the second exemplary embodiment, in a case where shaking correction processing is performed (in a case where the shaking correction processing is valid), an intensity determination circuit 114 selects, like in the first exemplary embodiment, the uniform intensity.

In a case where a variation degree of the movement amount of the area is equal to a predetermined value or more, also in the second exemplary embodiment like the first exemplary embodiment described above, a maximum value of the movement amount in statistical data of the movement amount is used as a reference value, and the uniform intensity is calculated based on the reference value. That is, also in the second exemplary embodiment, in a case where the variation degree of the movement amount of the area is greater than or equal to the predetermined value, an afterimage can be prevented from occurring by performing the cyclic NR processing aware of a region where the movement amount of the area is large.

In this case, on the other hand, if the intensity calculated using the maximum value of the movement amount as the reference value as described above, a region is generated where the cyclic NR processing is performed with intensity weaker than the intensity to be originally applied. In other words, the uniform intensity calculated using the maximum value of the movement amount as the reference value becomes weaker than the intensity to be originally applied to the region where the movement amount is smaller than the reference value. That is, in the region where the movement amount is smaller than the reference value of the movement amount, an effect of noise reduction by the cyclic NR processing is reduced.

Thus, in the imaging apparatus according to the second exemplary embodiment, as illustrated in FIG. 7B, for the region where the movement amount is smaller than the reference value, the noise reduction is achieved by increasing intensity of the spatial NR processing with an increasing difference between the intensity to be originally applied and the uniform intensity calculated from the reference value. In other words, if the reference value of the movement amount is Th3, for a region where the movement amount is smaller than the reference value Th3, noise reduction is achieved by increasing (enhancing) the intensity of the spatial NR processing for a region with a decreasing movement amount.

The spatial NR processing in the second exemplary embodiment is performed by the image processing circuit 116 in FIG. 1 described above. Thus, in the second exemplary embodiment, the intensity determination circuit 114 obtains a difference between the intensity to be originally applied and the uniform intensity, and the image processing circuit 116 controls the intensity of the spatial NR processing based on the difference. That is, in the second exemplary embodiment, the intensity determination circuit 114 controls the image processing circuit 116 to increase the intensity of the spatial NR processing with an increasing difference between the intensity in units of areas and the uniform intensity. Accordingly, in the case of the second exemplary embodiment, an effect of the spatial NR processing is enhanced for a region with an increasing difference between the intensity to be originally applied and the uniform intensity. As the spatial NR processing, for example, the following method is known. First, a region of a predetermined size is set around a pixel to be processed and then, a pixel having a signal level at which a difference from the signal level of the pixel to be processed is equal to or less than a threshold value is extracted in the set region. Then, a value obtained by averaging the signal level of the pixel to be processed and the signal level of the extracted pixel, or a value obtained by weighted averaging is used as the signal level of the pixel to be processed. As a method for increasing the intensity of the spatial NR processing, enlarging the predetermined size and increasing the threshold value can be considered. Alternatively, an edge direction in a region including a processing target is determined, and a low-pass filter is applied along the edge direction. By changing a filter coefficient of the low-pass filter, the intensity of the spatial NR processing can be increased. The intensity determination circuit 114 can control the intensity of the spatial NR processing in a case where the number of areas having a large difference between the intensity to be originally applied and the uniform intensity is larger than a predetermined number.

In the second exemplary embodiment, as described above, in a case where the variation degree of the movement amount of the area is greater than or equal to the predetermined value, the maximum value of the movement amount is used as the reference value for calculation of the uniform intensity, and the uniform intensity is calculated based on the reference value of the movement amount. Further, in the second exemplary embodiment, as illustrated in FIGS. 7A and 7B, a value of the uniform intensity is lower than a value of the area unit intensity, and the intensity of the spatial NR processing is increased for a region with an increasing difference between the values. Therefore, according to the second exemplary embodiment, an effect of the noise reduction can be improved while suppressing the generation of image data that appears to have regions where shaking occurs and regions where shaking does not occur.

Figure 8A:
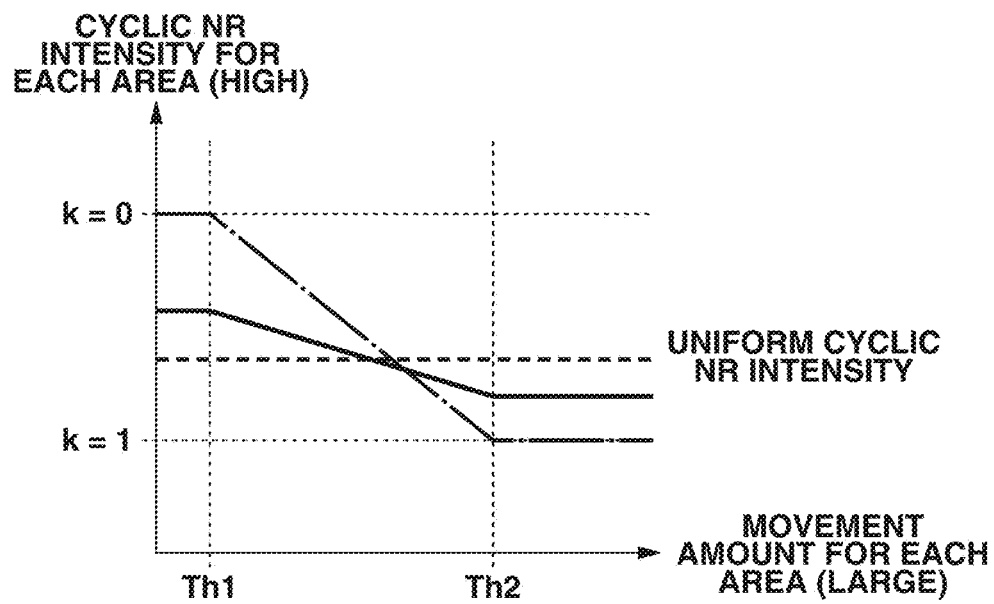
FIGS. 8A and 8B are diagrams illustrating a relationship between intensity in units of areas and the uniform intensity in a third exemplary embodiment.
Figure 8B:
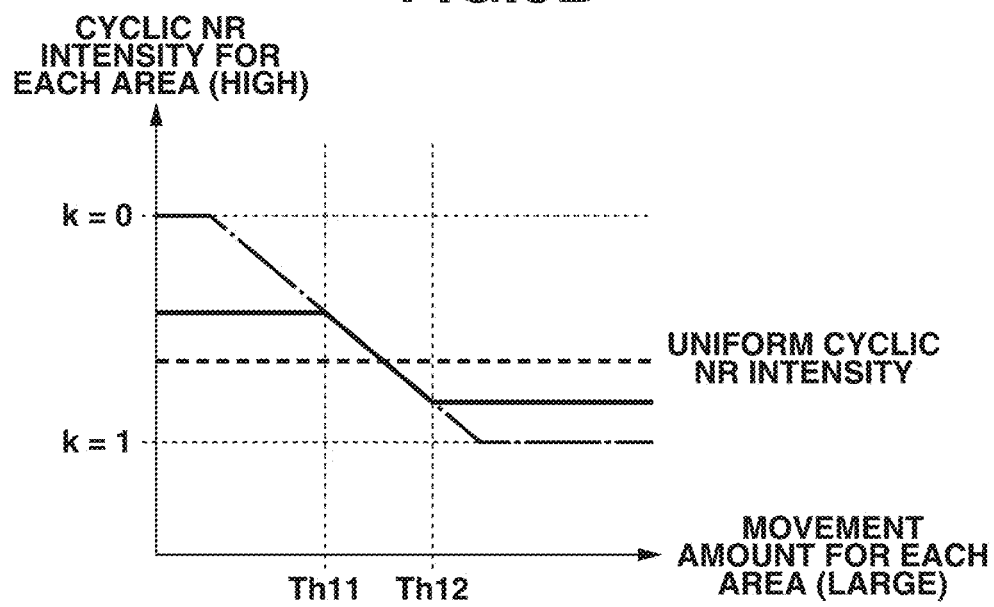

Intensity control in an imaging device according to a third exemplary embodiment will be described with reference to FIGS. 8A and 8B. FIGS. 8A and 8B are diagrams illustrating a relationship between intensity in units of areas and uniform intensity. Since a configuration of the imaging apparatus according to the third exemplary embodiment is substantially the same as that of FIG. 1 described above, an illustration thereof is omitted.

In a case of the imaging apparatus according to the third exemplary embodiment, the intensity determination circuit 114 in FIG. 1 determines a settable range of the intensity in units of areas in accordance with a movement amount of each area based on a shaking amount calculated by a shaking amount calculation circuit 112.

In a case where the shaking amount calculated by the shaking amount calculation circuit 112 is larger than a first threshold value, an influence of shaking correction processing performed after cyclic NR processing increases and so the intensity determination circuit 114 calculates, like in the first and second exemplary embodiments described above, the uniform intensity. That is, in a case where a detected shaking amount is larger than the first threshold value, the intensity determination circuit 114 according to the third exemplary embodiment does not perform cyclic NR processing in which the intensity in units of areas is set. In a case where the detected shaking amount is larger than the first threshold value, also in the third exemplary embodiment like in the second exemplary embodiment described above, an image processing circuit 116 can perform intensity control of spatial NR processing.

FIGS. 8A and 8B are diagrams illustrating intensity of the cyclic NR processing in a case where the calculated shaking amount is (i) equal to or less than the first threshold value and (ii) greater than or equal to a second threshold value, whereby the second threshold value is smaller than the first threshold value. In a case where the calculated shaking amount is (i) equal to or less than the first threshold value and (ii) greater than or equal to the second threshold value, a shaking correction circuit 117 performs the shaking correction processing. In a case where the calculated shaking amount is equal to or less than the first threshold value and greater than or equal to the second threshold value, as illustrated in FIGS. 8A and 8B, the intensity determination circuit 114 sets the intensity in units of areas within a range in which the influence of the subsequent shaking correction processing is not exerted.

In a case where the calculated shaking amount is equal to or less than the first threshold value and greater than or equal to the second threshold value (which is smaller than the first threshold value), a difference in the shaking amount depending on a region of the image data is small as compared with a case where the shaking amount is larger than the first threshold value. However, even in a case where the calculated shaking amount is equal to or less than the first threshold value and greater than or equal to the second threshold value, the difference in the shaking amount may be large to some extent depending on the region of the image data. Therefore, as illustrated in FIGS. 8A and 8B, the intensity determination circuit 114 restricts the settable range of the intensity in units of areas to be narrowed such that the difference in the shaking amount depending on the region in the image data is decreased (i.e., the difference is prevented from increasing).

Specifically, in a case where the calculated shaking amount is equal to or less than the first threshold value and greater than or equal to the second threshold value, the intensity determination circuit 114 first acquires statistical data of the movement amount and calculates a reference value of the movement amount from the statistical data. As the reference value of the movement amount, for example, an average value or a median value in the statistical data of the movement amount can be used. Next, the intensity determination circuit 114 calculates the settable range of the intensity in units of areas based on the reference value of the movement amount. In FIGS. 8A and 8B, a thick solid line indicates the intensity in units of areas, a thick dotted line indicates the uniform intensity based on the reference value of the movement amount, and an alternate long and short dash line indicates the intensity in units of areas in a case where the shaking amount is larger than the first threshold value. For example, in a case where the shaking amount is equal to or less than the first threshold value and greater than or equal to the second threshold value, the intensity determination circuit 114 restricts the settable range of the intensity in units of areas to be narrowed such that the difference in the shaking amount depending on the region in the image data is decreased and the difference from the uniform intensity falls within a predetermined range.

As a technique for restricting the settable range of the intensity to be narrowed, for example, a method of referring to a table, in which the calculated shaking amount and a value of the settable range of the intensity in units of areas are associated, can be used. That is, in this table, the value of the settable range of the intensity in units of areas is set to a value of the shaking amount that is equal to or less than the first threshold value and greater than or equal to the second threshold value. The first threshold value, the second threshold value, and values to be stored in the table can be experimentally determined by actually changing the value while determining the difference in the shaking amount included in the image data subjected to the processing. Further, as another method of restricting the settable range of the intensity to be narrowed, a method of determining the settable range of the intensity by computation using the detected shaking amount as a parameter can be used.

Then, the intensity determination circuit 114 sets the intensity in units of areas in accordance with the movement amount for each area in the settable range of the intensity in units of areas set as described above, and performs the cyclic NR processing. That is, in the case of the third exemplary embodiment, the intensity in units of areas of the cyclic NR processing in accordance with the movement amount for each area can be set within the settable range of the intensity in units of areas. Accordingly, it is possible for a cyclic NR processing circuit 115 to achieve noise reduction appropriate for movement of a subject. Further, also in the third exemplary embodiment, like in each exemplary embodiment described above, the shaking correction processing is performed after the cyclic NR processing and thus, the generation of the image data that appears to have regions where shaking occurs and regions where shaking does not occur can be suppressed.

The shaking correction circuit 117 also performs the shaking correction processing in a case where the calculated shaking amount is equal to or less than the second threshold value and is larger than a third threshold value (which is smaller than the second threshold value). In a case where the shaking amount is equal to or less than the second threshold value and is larger than the third threshold value, the influence of the shaking correction processing performed thereafter is small, even if the cyclic NR processing with the intensity set in units of areas is performed. Thus, even if there is a difference in the shaking amount depending on the region of the image data, the difference is not discernible to the eye. Therefore, in a case where the calculated shaking amount is equal to or less than the second threshold value and larger than the third threshold value, the intensity determination circuit 114 sets the settable range of the intensity in units of areas to be wide. In other words, in a case where the detected shaking amount is smaller than the second threshold value, the intensity determination circuit 114 makes the settable range of a coefficient k narrower than in FIG. 4 and wider than the settable range illustrated in FIG. 8A (or FIG. 8B). That is, in a case where the calculated shaking amount is equal to or less than the second threshold value and larger than the third threshold value, the intensity determination circuit 114 performs suitable cyclic NR processing in accordance with the movement amount in units of areas. In a case where the calculated shaking amount is equal to or less than the third threshold value, the shaking correction circuit 117 does not perform the shaking correction processing, and the cyclic NR processing circuit 115 performs the cyclic NR processing with the intensity in units of areas illustrated in FIG. 4.

As described above, even if the shaking correction processing is performed, the imaging apparatus according to the third exemplary embodiment can improve the effect of the noise reduction while suppressing the generation of the image data that appears to have regions where shaking occurs and regions where shaking does not occur by setting the intensity in units of areas in a range in accordance with the shaking amount.

In the foregoing, the exemplary embodiments of the present invention have been described, but the present invention is not limited to these exemplary embodiments and various modifications and alterations can be made within the scope thereof.

The imaging processing apparatus according to the exemplary embodiments of the present invention described above can be applied to various portable terminals such as digital cameras, digital video cameras, smartphones and tablet terminals equipped with camera functions, industrial cameras, onboard cameras, and medical cameras. Further, the present invention can be carried out only by the image processing apparatus 110 in FIG. 1, and thus the image generation apparatus 100, the display device 121, and the recording circuit 122 can be separate apparatuses. For example, the present invention is also applicable to personal computers, server computers, and the like that perform cyclic NR processing and shaking correction processing by receiving image data through communication from the various cameras described above.

The above-described exemplary embodiments merely illustrate embodying examples when the present invention is carried out, and the technical scope of the present invention should not be interpreted restrictively due to the exemplary embodiments. That is, the present invention can be carried out in various forms without deviating from its technical ideas or main features thereof.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2017-186768 filed Sep. 27, 2017, and No. 2018-164468 filed Sep. 3, 2018, which are hereby incorporated by reference herein in their entirety.

The invention claimed is:

1. An image processing method executed by an image processing apparatus, the method comprising:
    detecting a movement amount from each area of image data;
    calculating a shaking amount of an imaging apparatus that has imaged the image data;
    determining an intensity of cyclic noise reduction processing;
    performing the cyclic noise reduction processing on the image data; and
    selectively performing shaking correction processing to suppress shaking of the image data subjected to the cyclic noise reduction processing based on the shaking amount,
    wherein the intensity of the cyclic noise reduction processing is determined in units of areas based on the detected movement amount in a case where the shaking correction processing is not enabled, and
    wherein the intensity of the cyclic noise reduction processing is uniformly determined to all areas of the image data in a case where the shaking correction processing is enabled.

2. The image processing method according to claim 1, further comprising obtaining a variation degree of the movement amount from the statistical data of the movement amount,
    wherein the intensity of the cyclic noise reduction processing to be uniformly set to all the areas is calculated based on the variation degree of the movement amount.

3. The image processing method according to claim 2, further comprising selecting a reference value based on the variation degree of the movement amount, wherein the intensity of the cyclic noise reduction processing to be uniformly set to all the areas is calculated based on the reference value.

4. The image processing method according to claim 3, wherein, in a case where the variation degree of the movement amount is smaller than a predetermined value, an average value or a median value of the movement amount is selected as the reference value.

5. The image processing method according to claim 3, wherein, in a case where the variation degree of the movement amount is equal to or more than a predetermined value, a maximum value of the movement amount is selected as the reference value.

6. The image processing method according to claim 1, further comprising performing spatial noise reduction processing on the image data after the cyclic noise reduction processing,
    wherein intensity of the spatial noise reduction processing is set based on the intensity of the cyclic noise reduction processing uniformly set to all the areas.

7. The image processing method according to claim 6, wherein the intensity of the spatial noise reduction processing is set higher for a region with an increasing difference between the intensity of the cyclic noise reduction processing uniformly set to all the areas and the intensity of the cyclic noise reduction processing based on the movement amount.

8. The image processing method according to claim 1, wherein the predetermined condition is that the shaking amount is less than or equal to a first threshold value.

9. The image processing method according to claim 8, wherein the shaking correction processing is not performed in a case where the shaking amount is smaller than a second threshold value that is smaller than the first threshold value, and is performed in a case where the shaking amount is equal to or more than the second threshold value.

10. The image processing method according to claim 9, wherein the intensity of the cyclic noise reduction processing set in the units of areas is selected from a settable range, and the settable range in a case where the shaking amount is the first threshold value or less and the second threshold value or more is narrower than that in a case where the shaking amount is the second threshold value or less.

11. The image processing method according to claim 10, wherein the values in the settable range are associated with a shaking amount.

12. A non-transitory computer-readable storage medium storing a program that causes an image processing apparatus to perform a method according to claim 1.

13. An image processing apparatus comprising:
    a movement amount detection circuit that detects a movement amount from each area of image data;
    a shaking amount calculation circuit that calculates a shaking amount of an imaging apparatus that has imaged the image data;
    a processing circuit that performs cyclic noise reduction processing on the image data;

a control circuit that controls the cyclic noise reduction processing; and a correction circuit that selectively performs shaking correction processing to suppress shaking of the image data subjected to the cyclic noise reduction processing based on the shaking amount, wherein the control unit determines an intensity of the cyclic noise reduction processing in units of areas based on the movement amount in a case where the shaking correction processing is not enabled, and wherein the control unit determines the intensity of the cyclic noise reduction processing uniformly to all areas of the image data in a case the shaking correction processing is not enabled.

14. An imaging apparatus comprising:

an image sensor; and an image processing apparatus according to claim 13.

* * * * *